United States Patent
Jensen et al.

(10) Patent No.: US 10,476,555 B2
(45) Date of Patent: Nov. 12, 2019

(54) CHASSIS BASED ANTENNA FOR A NEAR FIELD COMMUNICATION (NFC) ENABLED DEVICE

(71) Applicant: Avago Technologies International Sales Pte. Limited, Singapore (SG)

(72) Inventors: Henrik T. Jensen, Long Beach, CA (US); Hyungpyo Lee, Seoul (KR)

(73) Assignee: Avago Technologies International Sales Pte. Limited, Singapore (SG)

(*) Notice: Subject to any disclaimer, the term of this patent is extended or adjusted under 35 U.S.C. 154(b) by 274 days.

(21) Appl. No.: 14/708,916

(22) Filed: May 11, 2015

(65) Prior Publication Data

US 2016/0308588 A1 Oct. 20, 2016

Related U.S. Application Data

(60) Provisional application No. 62/148,394, filed on Apr. 16, 2015.

(51) Int. Cl.
*H04B 5/02* (2006.01)
*H04B 5/00* (2006.01)
*H04B 1/40* (2015.01)

(52) U.S. Cl.
CPC ............... *H04B 5/02* (2013.01); *H04B 1/40* (2013.01); *H04B 5/0031* (2013.01); *H04B 5/0075* (2013.01)

(58) Field of Classification Search
CPC combination set(s) only.
See application file for complete search history.

(56) References Cited

U.S. PATENT DOCUMENTS

| | | | |
|---|---|---|---|
| 2010/0156726 A1* | 6/2010 | Montgomery | H01Q 7/00 343/700 MS |
| 2013/0307742 A1* | 11/2013 | Hu | H01Q 1/243 343/821 |
| 2014/0057501 A1* | 2/2014 | Petrucci | H01R 4/029 439/874 |
| 2014/0300518 A1* | 10/2014 | Ramachandran | H01Q 1/243 343/702 |
| 2014/0347233 A1* | 11/2014 | Mahanfar | H01Q 1/521 343/720 |
| 2016/0063232 A1* | 3/2016 | Seol | G06F 3/03547 726/19 |

* cited by examiner

*Primary Examiner* — Zhitong Chen
(74) *Attorney, Agent, or Firm* — Sterne, Kessler, Goldstein & Fox P.L.L.C.

(57) ABSTRACT

The present disclosure describes various chassis based antennas for a communication device. These various chassis based antennas can be integrated within a mechanical chassis of the communication device. The mechanical chassis is at least partially constructed of one or more conductive materials, such as copper or aluminum to provide some examples, or combinations of conductive materials, to provide one or more conductive paths for the communication device. The communication device can use these one or more conductive paths as one or more chassis based antennas for communication.

23 Claims, 6 Drawing Sheets

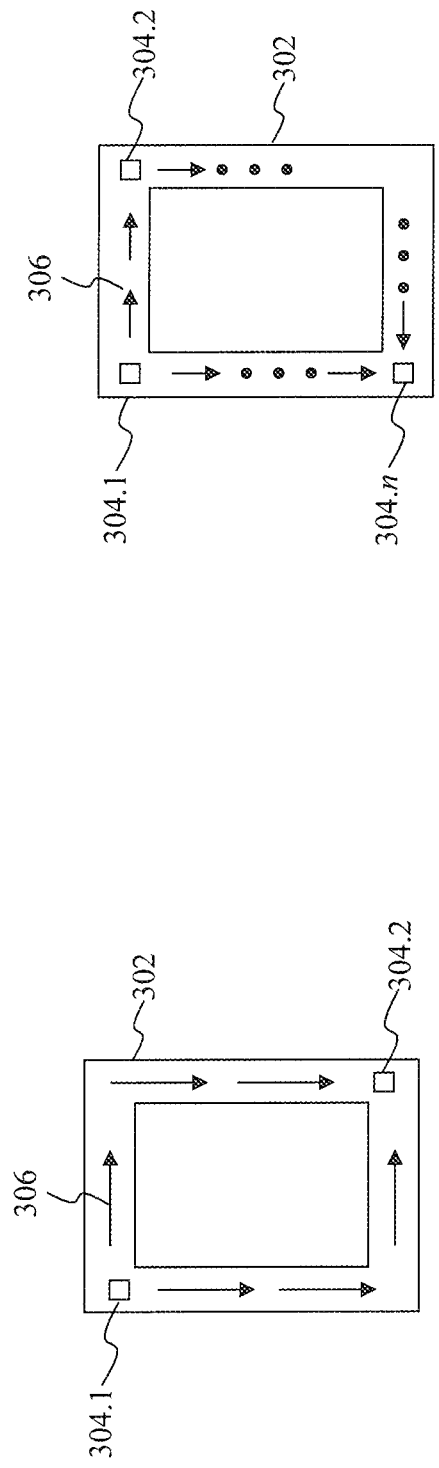

CHASSIS BASED ANTENNA FOR A NEAR FIELD COMMUNICATION (NFC) ENABLED DEVICE

CROSS-REFERENCE TO RELATED APPLICATIONS

The present application claims the benefit of U.S. Provisional Patent Appl. No. 62/148,394, filed Apr. 16, 2015, which is incorporated herein by reference in its entirety.

BACKGROUND

Field of Disclosure

The present disclosure generally relates to a communication device and including an antenna that is integrated within a mechanical chassis of the communication device.

Related Art

The continued improvement of semiconductor fabrication processes has allowed manufacturers and designers to create a smaller and a more powerful electronic device. This smaller and more powerful electronic device is being integrated with near field communication (NFC) technology to facilitate the use of this electronic device in conducting daily transactions. For example, instead of carrying numerous credit cards, the credit information provided by these credit cards can be loaded and stored onto an NFC enabled device to be used as needed. The NFC enabled device is simply tapped to a credit card terminal to relay the credit information to complete a transaction. As another example, a ticket writing system, such as those used in bus and train terminals, may simply write ticket fare information onto the NFC enabled device instead of providing a paper ticket to a passenger. The passenger simply taps the NFC enabled device to a reader to ride the bus or the train without using a traditional the paper ticket.

Although the electronic, mechanical, and/or electro-mechanical components have become smaller and more powerful, an antenna used by this electronic device for NFC has almost remained the same. In some situations, the antenna itself is larger than all of the other electronic, mechanical, and/or electro-mechanical components within the electronic device. Often times, the antenna is placed onto another substrate that is connected to the components of the electronic device. This other substrate and the components are all placed within a mechanical chassis of the communication device.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

FIG. 3B illustrates a second operation of the first and the second mechanical enclosures according to an exemplary embodiment of the disclosure;

FIG. 3C illustrates a third operation of the first and the second mechanical enclosures according to an exemplary embodiment of the disclosure.

DETAILED DESCRIPTION OF THE DISCLOSURE

Overview

The present disclosure describes various chassis based antennas for a communication device. These various chassis based antennas can be integrated within a mechanical chassis of the communication device. The mechanical chassis is at least partially constructed of one or more conductive materials, such as copper or aluminum to provide some examples, or combinations of conductive materials, to provide one or more conductive paths for the communication device. The communication device can use these one or more conductive paths as one or more chassis based antennas for communication.

An Exemplary Communication Device

Figure 1:
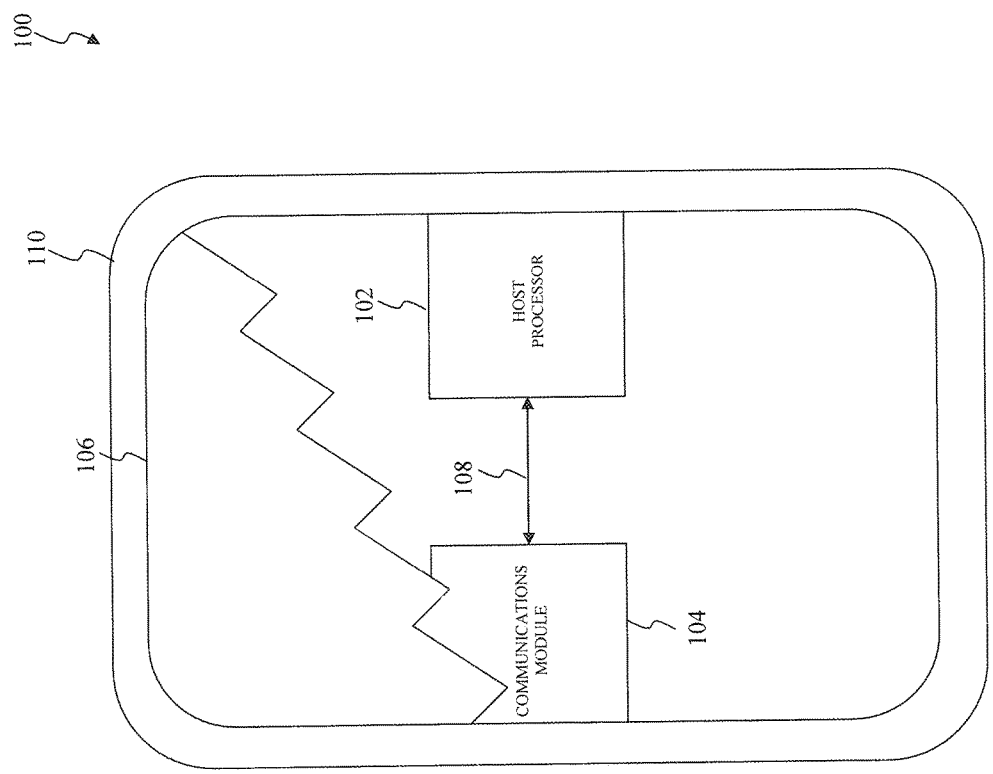
FIG. 1 illustrates a block diagram of a communication device according to an exemplary embodiment of the disclosure.

FIG. 1 illustrates a block diagram of a communication device according to an exemplary embodiment of the disclosure. The communication device 100 can represent an all-in-one computer, a tablet computer, a mobile phone, a personal digital assistant (PDA), a satellite navigation device, video gaming device, a kiosk system in retail and tourist settings, a point of sale system, an automatic teller machine (ATM), an electronic accessory such as a smart watch, or any other suitable communication device that will be apparent to those skilled in the relevant art(s) without departing from the spirit and scope of the present disclosure. As illustrated in FIG. 1, the communication device 100 can include a host processor 102, a communication module 104, and a touch-screen display 106 that are communicatively coupled via a communication interface 108. References in the disclosure to a "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The host processor 102 controls overall operation and/or configuration of the communication device 100. The host processor 102 can receive and/or process information from a user interface such as an alphanumeric keypad, a microphone, a mouse, a speaker, and/or from other electrical devices or host devices that are coupled to the communication device 100. The host processor 102 can provide this information to the communication module 104 and/or the touch-screen display 106. Additionally, the host processor 102 can receive and/or process information from the communication module 104 and/or the touch-screen display 106. The host processor 102 can provide this information to the communication module 104 and/or the touch-screen display 106 and/or to other electrical devices or host devices. Further, the host processor 102 can execute one or more applications such as Short Message Service (SMS) for text messaging, electronic mailing, and/or audio and/or video recording to provide some examples, and/or software applications such as a calendar and/or a phone book to provide some examples.

The communication module 104 provides voice or data communication for a user of the communication device 100. The communication module 104 can include one or more of: a Bluetooth module, a Global Position System (GPS) module, a cellular module, a wireless local area network (WLAN) module, a near field communication (NFC) module, a radio frequency identification (RFID) module and/or a wireless power transfer (WPT) module. The Bluetooth module, the cellular module, the WLAN module, the NFC module, and the RFID module provide wireless communication between the communication device 100 and other Bluetooth, other cellular, other WLAN, other NFC, and other RFID enabled communication devices, respectively, in accordance with various communication standards or protocols. These various communication standards or protocols can include various cellular communication standards such as a third Generation Partnership Project (3GPP) Long Term Evolution (LTE) communication standard, a fourth generation (4G) mobile communication standard, or a third generation (3G) mobile communication standard, various networking protocols such a Wi-Fi communication standard, various NFC/RFID communication protocols such as ISO 1422, ISO/IEC 14443, ISO/TEC 15693, ISO/IEC 18000, or FeliCa to provide some examples. The GPS module receives various signals from various satellites to determine location information for the communication device 100. The WPT module supports wireless transmission of power between the communication device 100 and another WPT enabled communication device.

The communications module 104 can include a transceiver having a transmitter and a receiver that have one or more processors, circuitry, and/or logic configured to transmit and receive wireless communications, respectively, via one or more antennas. Those skilled in the relevant art(s) will recognize that the transceiver can include, but is not limited to, a digital signal processor (DSP), modulator and/or demodulator, a digital-to-analog converter (DAC), an analog-to-digital converter (ADC), and/or one or more frequency converters, such as one or more mixers, one or more local oscillators, and/or one or more filters to provide some examples. The touch-screen display 106 provides a graphical user interface for the user of the communication device 100. The touch-screen display 106 operates as an output device to provide images relating to the voice or the data communication and/or the one or more applications to the user of the communication device 100. The touch-screen display 106 also operates as an input device to receive one or more commands and/or data from the user of the communication device 100 for the voice or data communication and/or the one or more applications.

The communication interface 108 routes various communications between the host processor 102, the communication module 104, and the touch-screen display 106. The communication interface 108 can be implemented as a series of wired and/or wireless interconnections between the host processor 102, the communication module 104, and the touch-screen display 106. The interconnections of the communication interface 108 can be arranged to form a parallel interface to route communication between the host processor 102, the communication module 104, and the touch-screen display 106 in parallel, or a serial interface to route communication between the host processor 102, the communication module 104, and the touch-screen display 106, or any combination thereof.

As further illustrated in FIG. 1, the host processor 102, the communication module 104, the touch-screen display 106, and the communication interface 108 are contained within a mechanical chassis 110 of the communication device 100. The mechanical chassis 110 is at least partially constructed of one or more conductive materials, such as copper or aluminum to provide some examples, or combinations of conductive materials, to provide one or more conductive paths to form one or more chassis based antennas for the communication device 100. In an exemplary embodiment, the communication module 104 uses the one or more chassis based antennas for communication modules having low operating frequencies, such as the NFC module, the RFID module, and/or the WPT module to provide some examples, and/or one or more non-chassis based antennas for communication modules having high operating frequencies, such as the Bluetooth module, the GPS module, the cellular module, and the WLAN module to provide some examples.

Exemplary Mechanical Chassis of the Communication Device

Figure 2A:
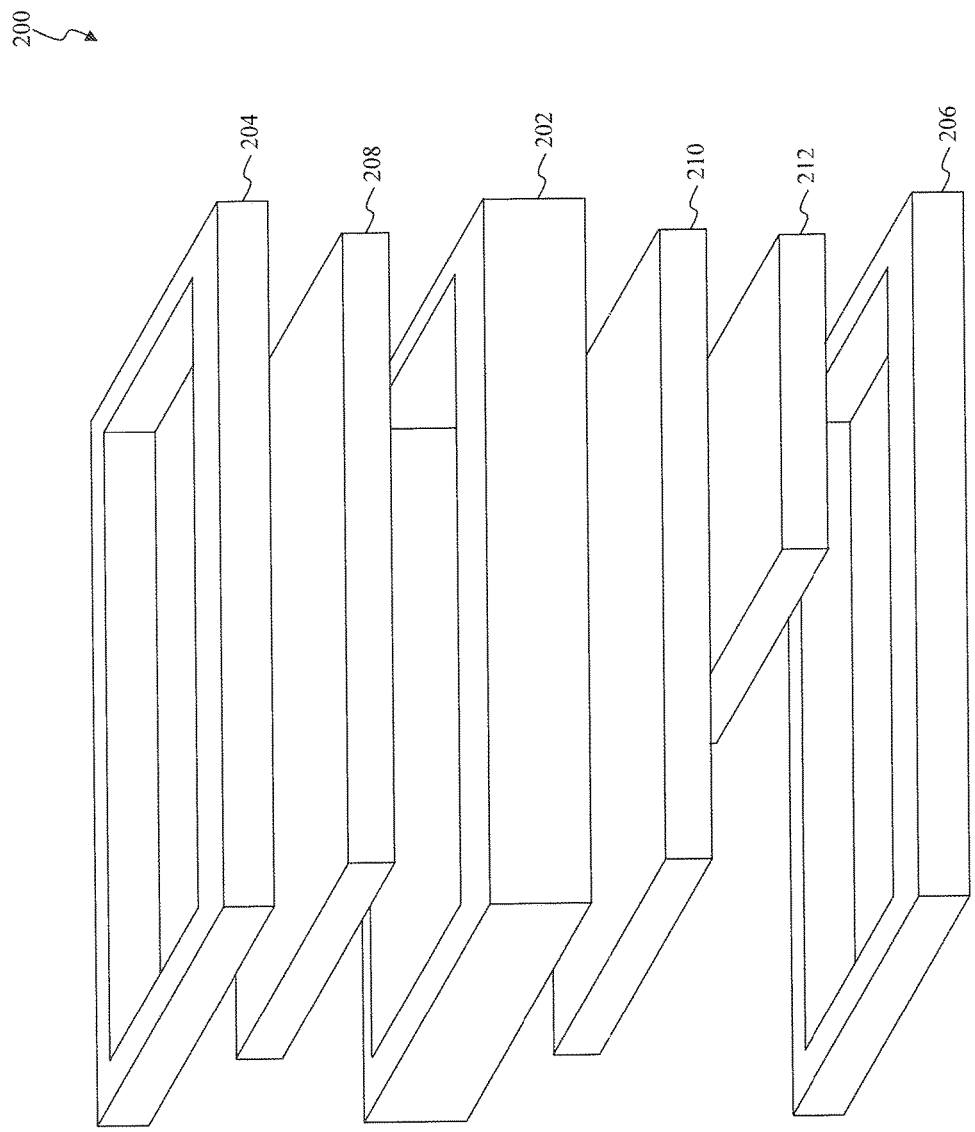
FIG. 2A illustrates a first exemplary mechanical chassis of the communication device according to an exemplary embodiment of the disclosure.

FIG. 2A illustrates a first exemplary mechanical chassis of the communication device according to an exemplary embodiment of the disclosure. A mechanical chassis 200 represents a frame or a housing containing or supporting electrical, mechanical, and/or electro-mechanical components of a communication device, such as the communication device 100 to provide an example. The mechanical chassis 200 includes a first enclosure 202 and a second enclosure 204 and a third enclosure 206 which are attached to the first enclosure 202. However, those skilled in the relevant art(s) will recognize that other configurations and arrangements are possible without departing from the spirit and scope of the present disclosure. For example, the second enclosure 204 and/or the third enclosure 206 can be integrated within the first enclosure 202 to form an integrated frame, as to discussed below with relation to FIG. 2B, containing or supporting the electrical, the mechanical, and/or the electro-mechanical components of the communication device.

The first enclosure 202 represents a foundation for assembling the electrical, the mechanical, and/or the electro-mechanical components of the communication device. As illustrated in FIG. 2A, the first enclosure 202 provides a manner for coupling or connecting a touch-screen display 208, such as the touch-screen display 106 to provide an example, and one or more semiconductor substrates and/or printed circuit boards 210 of the communication device. In an exemplary embodiment, the one or more semiconductor substrates and/or printed circuit boards 210 includes one or more semiconductor substrates and/or one or more printed circuit boards having a host processor, such as the host processor 102 to provide an example, and/or a communication module, such as the communication module 104 to provide an example, of the communication device. In some situations, various other electrical, mechanical, and/or electro-mechanical components of the communication device, such as a digital camera, an input/output device, a microphone, and/or a speaker to provide some examples, can be coupled to the first enclosure 202. Although not illustrated in FIG. 2A, the first enclosure 202 can include one or more openings for these other electrical, mechanical, and/or electro-mechanical components. Often times, the touch-screen display 208, the one or more semiconductor substrates and/or printed circuit boards 210, and/or these other electrical, mechanical, and/or electro-mechanical components of the communication device can be coupled together using one or more flexible flat cables (FFCs) though other couplings are possible that will be apparent to those skilled in the relevant art(s).

The mechanical chassis 200 additionally includes a top cover, represented as a second enclosure 204 in FIG. 2A, that is coupled to the first enclosure 202. The second enclosure 204 is attached to the first enclosure 202 to contain the touch-screen display 208, the one or more semiconductor substrates and/or printed circuit boards 210, the other electrical, mechanical, and/or electro-mechanical components of the communication device as well as the one or more flexible flat cables (FFCs) within the communication device. The second enclosure 204 can include one or more regions of transparent or semi-transparent material to cover at least a display area of the touch-screen display 208. Although not illustrated in FIG. 2A, the second enclosure 204 can include one or more openings for the other electrical, mechanical, and/or electro-mechanical components, such as the digital camera, the input/output device, the microphone, and/or the speaker to provide some examples.

The mechanical chassis 200 further includes a bottom cover, represented as a third enclosure 206 in FIG. 2A, that is coupled to the first enclosure 202. The third enclosure 206 is attached to the first enclosure 202 to contain the touch-screen display 208 and/or the one or more semiconductor substrates and/or printed circuit boards 210, a battery 212, the other electrical, mechanical, and/or electro-mechanical components of the communication device as well as the one or more flexible flat cables (FFCs) within the communication device. Although not illustrated in FIG. 2A, the third enclosure 206 can include one or more openings for the other electrical, mechanical, and/or electro-mechanical components, such as the digital camera, the input/output device, the microphone, and/or the speaker to provide some examples.

Although the mechanical chassis 200 includes the first enclosure 202, the second enclosure 204, and the third enclosure 206, this is for illustrative purposes only. Other configurations and arrangements for the mechanical chassis 200 are possible that will be apparent to those skilled in the relevant art(s). For example, the first enclosure 202, the second enclosure 204, and/or the third enclosure 206 can include multiple mechanical frames 202, first enclosures 204, and/or second enclosures 206 having different sizes and/or shapes than as illustrated to form the foundation for assembling the electrical, the mechanical, and/or the electro-mechanical components of the communication device. As another example, the first enclosure 202, the second enclosure 204, and/or the third enclosure 206 are formed into rectangular shapes as illustrated in FIG. 2A. However, those skilled in the relevant art(s) will recognize the first enclosure 202, the second enclosure 204, and/or the third enclosure 206 may be formed into other geometric shapes without departing from the spirit and scope of the present disclosure. These other geometric shapes may include regular or irregular polygons and/or closed curves to provide some examples. As a further example, the second enclosure 204 and/or the third enclosure 206 can be integrated within the first enclosure 202 to form an integrated frame.

Figure 2B:
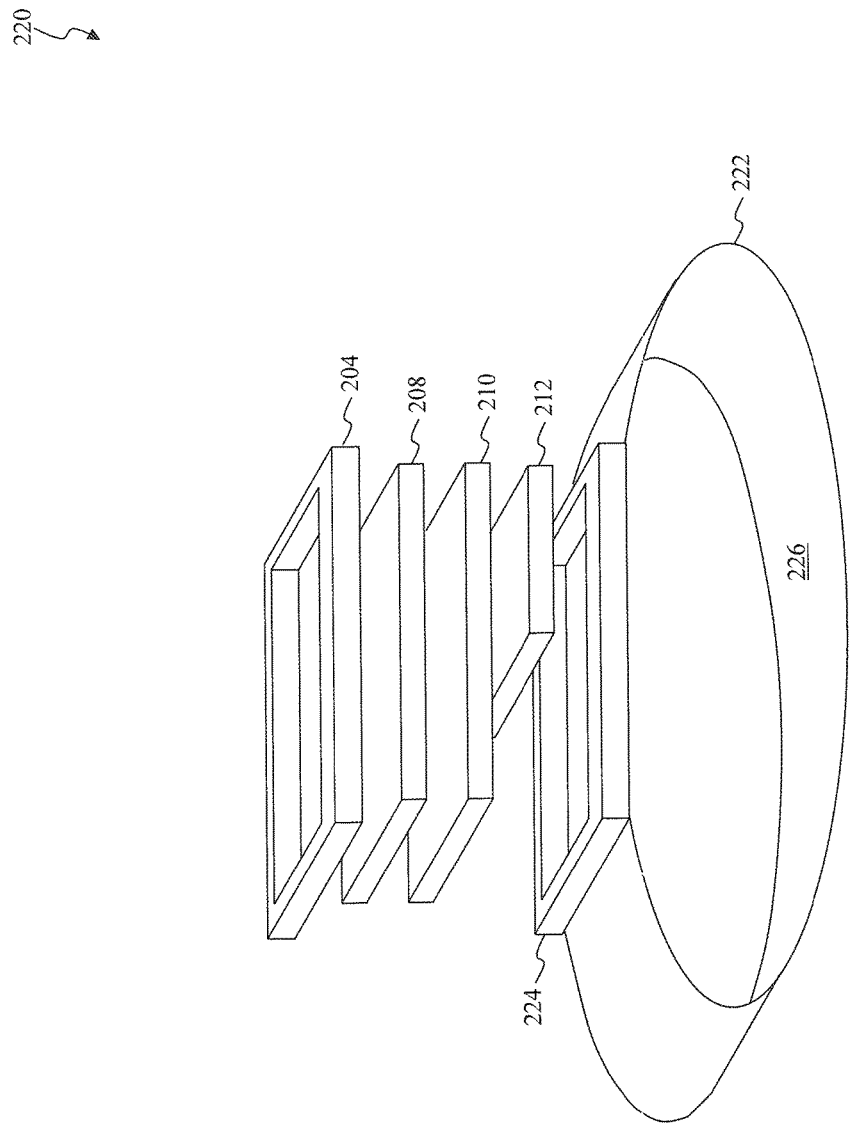
FIG. 2B illustrates a second exemplary mechanical chassis of the communication device according to an exemplary embodiment of the disclosure.

FIG. 2B illustrates a second exemplary mechanical chassis of the communication device according to an exemplary embodiment of the disclosure. A mechanical chassis 220 represents a frame or a housing containing or supporting the electrical, the mechanical, and/or the electro-mechanical components of the communication device, such as the communication device 100 to provide an example, which is implemented as a wearable communication device. The mechanical chassis 220 includes the second enclosure 204 that is attached to an integrated enclosure 222.

The integrated enclosure 222 represents a foundation for assembling the electrical, the mechanical, and/or the electro-mechanical components of the communication device. As illustrated in FIG. 2B, the integrated enclosure 222 provides a manner for coupling or connecting the touch-screen display 208, the one or more semiconductor substrates and/or printed circuit boards 210, and the battery 212 of the communication device. In some situations, various other electrical, mechanical, and/or electro-mechanical components of the communication device, such as a digital camera, an input/output device, a microphone, and/or a speaker to provide some examples, to the integrated enclosure 222. Although not illustrated in FIG. 2B, the integrated enclosure 222 can include one or more openings for these other electrical, mechanical, and/or electro-mechanical components. Often times, the touch-screen display 208, the one or more semiconductor substrates and/or printed circuit boards 210, and/or these other electrical, mechanical, and/or electro-mechanical components of the communication device can be coupled together using one or more flexible flat cables (FFCs) though other couplings are possible that will be apparent to those skilled in the relevant art(s).

As illustrated in FIG. 2B, the integrated enclosure 222 includes an integrated device enclosure 224 for assembling the electrical, the mechanical, and/or the electro-mechanical components of the communication device and a wristband enclosure 226 for securing the communication device to the user. In an exemplary embodiment, the integrated enclosure 222 and/or the wristband enclosure 226 is at least partially constructed of one or more conductive materials, such as copper or aluminum to provide some examples, or combinations of conductive materials, to provide one or more conductive paths to be used as one or more chassis based antennas for the communication device. In this exemplary embodiment, any combination of the one or more conductive paths provided by the wristband enclosure 226 and the one or more conductive paths provided by the integrated device enclosure 224 can be used as the one or more chassis based antennas for the communication device.

Exemplary Chassis Based Antenna of the Communication Device

Figure 3A:
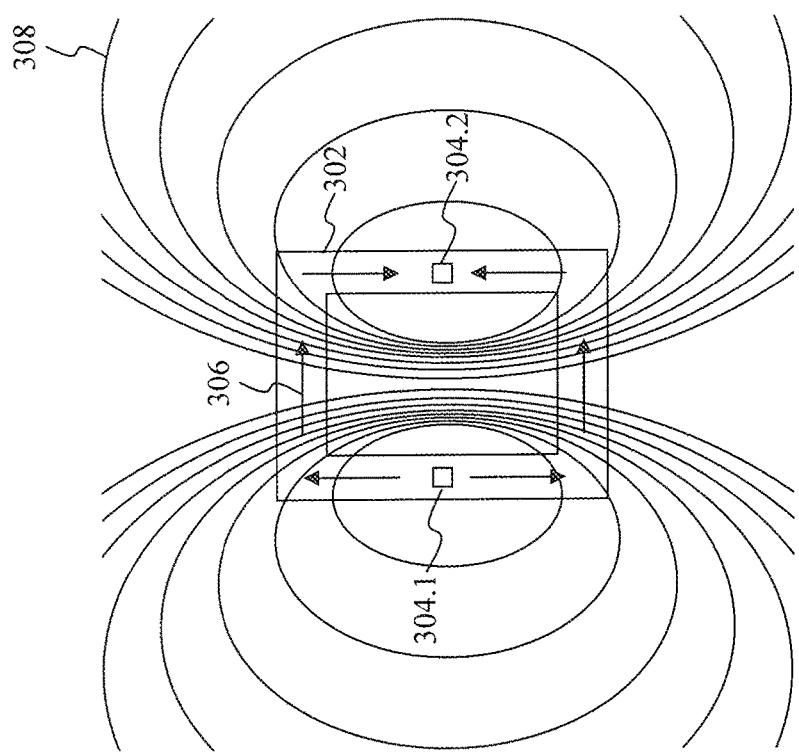
FIG. 3A illustrates a first operation of the first and the second mechanical enclosures according to an exemplary embodiment of the disclosure.

FIG. 3A illustrates a first operation of the first and the second mechanical enclosures according to an exemplary embodiment of the disclosure. A mechanical enclosure 302 is at least partially constructed of one or more conductive materials, such as copper or aluminum to provide some examples, or combinations of conductive materials, to provide one or more conductive paths to be used as one or more chassis based antennas for the communication device. For example, the mechanical enclosure 302 can be entirely constructed of the one or more conductive materials or constructed of a combination of the one or more conductive materials and one or more non-conductive materials, such as one or more synthetic or semi-synthetic organic solids to provide an example. The mechanical enclosure 302 can represent an exemplary embodiment of the first enclosure 202, the second enclosure 204, and/or the third enclosure 206.

As illustrated in FIG. 3A, the mechanical enclosure 302 includes a first electrical connection 304.1 and a second electrical connection 304.2. The first electrical connection 304.1 and the second electrical connection 304.2 represent an interface between the mechanical enclosure 302 and a communication module, such as the communication module 104 to provide an example, of a communication device. The first electrical connection 304.1 and a second electrical connection 304.2 represent areas within the mechanical enclosure 302 that can be used for attaching one or more communication couplings, such as one or more coaxial cables, one or more copper cables, one or more bond wires, such as aluminum, copper, or gold bond wires to provide some examples, or any combination thereof, between the mechanical enclosure 302 and the communication module of the communication device. In a first exemplary embodiment, the first electrical connection 304.1 and a second electrical connection 304.2 can represent solder pads for attaching the one or more communication couplings. In a second exemplary embodiment, the first electrical connection 304.1 and a second electrical connection 304.2 can represent various types of conductive fasteners, such as nuts, screws, bolts, and/or lags to provide some examples, that can be used to attach corresponding components, such as the touch-screen display 208, the one or more semiconductor substrates and/or printed circuit boards 210, various other electrical, mechanical, and/or electro-mechanical components of the communication device, such as a digital camera, an input/output device, a microphone, and/or a speaker to provide some examples, to the mechanical enclosure 302. It should be noted that the positioning of the first electrical connection 304.1 and the second electrical connection 304.2 within the mechanical enclosure 302 in FIG. 3A is for illustrative purposes only Those skilled in the relevant art(s) will recognize that other positions within the mechanical enclosure 302 are possible without departing from the spirit and scope of the present disclosure.

The conductive pathway between the first electrical connection 304.1 and a second electrical connection 3042 provide one or more conductive paths to be used as one or more chassis based antennas by the communication device. In the exemplary embodiment illustrated in FIG. 3A, the conductive pathway can be considered as electrically and mechanically connecting the first electrical connection 304.1 and the second electrical connection 304.2. As additionally illustrated in FIG. 3A, in a first mode of operation, the communication module can transmit information to a second communication module of a second communication device using the one or more chassis based antennas. In this first mode of operation, the communication module provides one or more electrical currents 306 through the one or more conductive paths between the first electrical connection 304.1 and the second electrical connection 304.2 to generate a magnetic field 308. These conductive paths are formed using the one or more conductive materials of the mechanical enclosure 302. The communication module can transmit information to the second communication module of the second communication device by modulating and/or encoding the one or more electrical currents 306 which in turn modulates and/or encodes the magnetic field 308. Alternatively, or in addition to, in a second mode of operation, the communication module can receive information from the second communication module of the second communication device using the one or more chassis based antennas. In this second mode of operation, the second communication module of the second communication device provides the magnetic field 308 to induce the one or more electrical currents 306 onto the one or more conductive paths between the first electrical connection 304.1 and the second electrical connection 304.2. The second communication module of the second communication device can transmit information to the communication module by modulating and/or encoding the magnetic field 308 which in turn modulates and/or encodes the one or more electrical currents 306.

It should be noted that the magnetic field 308 as illustrated in FIG. 3A is similar to that of two parallel current carrying conductors. However other types of magnetic fields are possible that will be apparent to those skilled in the relevant art(s). For example, the first electrical connection 304.1 and the second electrical connection 304.2 can be placed at other locations within the mechanical enclosure 302, such as corresponding corners of the mechanical enclosure 302 as illustrated in FIG. 3B to provide an example, to provide a magnetic field with different characteristics. As another example, more electrical connections can be used to likewise to provide a magnetic field with different characteristics as illustrated in FIG. 3C. In this other example, the one or more electrical currents 306 flow between pairs of these electrical connections 304.1 through 304.n in a similar manner as described in FIG. 3A to provide this magnetic field with these different characteristics.

Exemplary Communication Module of the Communication Device

Figure 4:
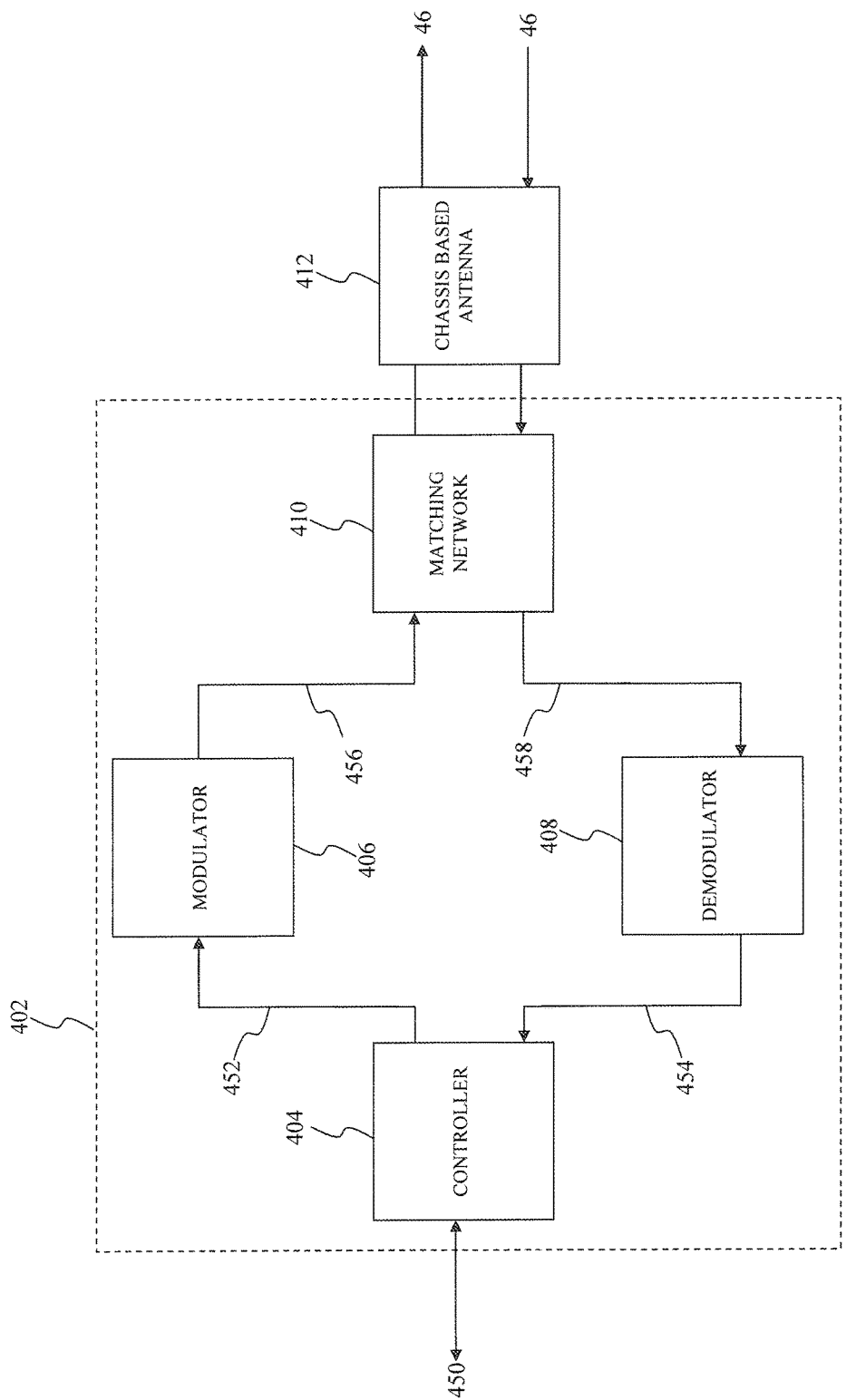
FIG. 4 illustrates a block diagram of a communication module of the communication device according to an exemplary embodiment of the disclosure.

FIG. 4 illustrates a block diagram of a communication module of the communication device according to an exemplary embodiment of the disclosure. An NFC communication module 402 provides wireless communication of information, such as one or commands and/or data, among a first communication device and a second NFC communication module of a second communication device that are sufficiently proximate to each other.

The NFC communication module 402 and/or the second NFC communication module interact with each other to exchange the information, in a peer (P2P) communication mode or a reader/writer (R/W) communication mode. In the P2P communication mode, the NFC communication module 402 and the second NFC communication module may be configured to operate according to an active communication mode and/or a passive communication mode. The NFC communication module 402 modulates its corresponding information onto a first carrier wave, referred to as a modulated information communication, and generates a first magnetic field by applying the modulated information communication to the first antenna to provide a first information communication. The NFC communication module 402 ceases to generate the first magnetic field after transferring its corresponding information to the second NFC communication module in the active communication mode. Alternatively, in the passive communication mode, the NFC communication module 402 continues to apply the first carrier wave without its corresponding information, referred to as an unmodulated information communication, to continue to provide the first information communication once the information has been transferred to the second NFC communication module.

In the R/W communication mode, the NFC communication module 402 is configured to operate in an initiator, or reader, mode of operation and the second NFC communication module is configured to operate in a target, or tag, mode of operation. However, this example is not limiting, those skilled in the relevant art(s) will recognize that the NFC communication module 402 may be configured to operate in the tag mode and the second NFC communication module may be configured to operate as in the reader mode in accordance with the teachings herein without departing from the spirit and scope of the present disclosure. The NFC communication module 402 modulates its corresponding information onto the first carrier wave and generates the first magnetic field by applying the modulated information communication to the first antenna to provide the first information communication. The NFC communication module 402 continues to apply the first carrier wave without its corresponding information to continue to provide the first information communication once the information has been transferred to the second NFC communication module. The NFC communication module 402 is sufficiently proximate to the second NFC communication module such that the first information communication is inductively coupled onto a second antenna of the second NFC communication module. The second NFC communication module derives or harvests power from the first information communication to recover, to process, and/or to provide a response to the information. The second NFC communication module demodulates the first information communication to recover and/or to process the information. The second NFC communication module may respond to the information by modulating the second antenna with its corresponding information to modulate the first carrier wave to provide the second modulated information communication.

As illustrated in FIG. 4, the NFC communication module 402 includes a controller module 404, a modulator 406, a demodulator 408, and a matching network 410 that are communicatively coupled to a chassis based antenna 412. The NFC communication module 402 can be implemented as part of a communication module, such as the communication module 104 to provide an example, of a communication device such as the communication device 100 to provide an example.

The controller module 404 controls overall operation and/or configuration of the NFC communication module 402. The controller module 404 provides information 450 to and/or receives the information 450 from one or more data storage devices such as one or more contactless transponders, one or more contactless tags, one or more contactless smartcards, any other machine-readable mediums that will be apparent to those skilled in the relevant art(s) without departing from the spirit and scope of the disclosure, or any combination thereof. The other machine-readable medium may include, but is not limited to, read only memory (ROM), random access memory (RAM), magnetic disk storage media, optical storage media, and/or flash memory devices to provide some examples. The controller module 404 may also provide the information 450 to and/or receive the information 450 from a user interface such as a touch-screen display, an alphanumeric keypad, a microphone, a mouse, a speaker, any other suitable user interface that will be apparent to those skilled in the relevant art(s) without departing from the spirit and scope of the disclosure to provide some examples. The controller module may further provide the information 450 to and/or receive the information 450 from other electrical devices or host devices coupled to the NFC communication module 402.

The controller module 404 can provide the information 450 as transmission information 452 for transmission to the second NFC communication module of the second communication device. Additionally, the controller module 404 can provide recovered information 454 from the demodulator 408 as the information 450. Further, the controller module 404 may also use the information 450 and/or the recovered information 454 to control the overall operation and/or configuration of the NFC communication module 402. For example, the controller module 404 may issue and/or execute the one or more commands in accordance with the information 450 and/or the recovered information 454, if appropriate, to control operations of the NFC communication module 402, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the disclosure.

The modulator 406 modulates the transmission information 452 onto a carrier wave using any suitable analog or digital modulation technique to provide a transmission signal 456. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The demodulator 408 demodulates a reception signal 458 using any suitable analog or digital modulation technique to provide the recovered information 454. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM), and/or any other suitable modulation technique that will be apparent to those skilled in the relevant art(s).

The chassis based antenna 412 applies the transmission signal 456 to generate a magnetic field to provide a transmitted communication signal 460. Additionally, the chassis based antenna 412 inductively receives a received communication signal 462 to provide the reception signal 458. The chassis based antenna 412 can be implemented using any of the chassis based antennas, or combinations of the chassis based antennas, as discussed in FIG. 1 through FIG. 3C.

The matching network 410 operates as an interface between the NFC communication module 402 and the chassis based antenna 412. The matching network 410 operates to match an impedance of the NFC communication module 402 to an impedance of the chassis based antenna 412 to improve power transfer between the NFC communication module 402 and the chassis based antenna 412 and/or to reduce signal reflection from the chassis based antenna 412. The matching network 410 can any combination of resistors, capacitors, inductors, and/or transformers that will be apparent to those skilled in the relevant art(s).

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A communication device, comprising: a communication module configured to communicate information; and a mechanical chassis containing the communication module, wherein the mechanical chassis includes a chassis based antenna, a first electrical connection, and a second electrical connection, the first electrical connection and the second electrical connection being configured to communicatively couple the chassis based antenna between a third electrical connection and a fourth electrical connection, respectively, of the communication module, and wherein the chassis based antenna includes: a conductive pathway, electrically and mechanically connecting the first electrical connection and the second electrical connection, configured to communicate the information with a second communication device,
    wherein the conductive pathway is arranged to form a closed loop, the closed loop including the first electrical connection and the second electrical connection.

2. The communication device of claim 1, wherein the communication module comprises:
    a near field communication (NFC) communication module configured to provide a current that propagates through the conductive pathway to generate a magnetic field to communicate the information with the second communication device.

3. The communication device of claim 2, wherein the chassis based antenna is configured to:
    inductively receive a second current from a second magnetic field generated by the second communication device, and
    provide the second current to the NFC communication module over the conductive pathway to communicate the information with the second communication device.

4. The communication device of claim 1, wherein the mechanical chassis comprises at least one of:
    a first enclosure configured to provide a top cover for the communication device; or
    a second enclosure configured to provide a bottom cover for the communication device wherein the second enclosure comprises:
    the chassis based antenna.

5. The communication device of claim 1, wherein the first electrical connection and the second electrical connection comprise:
    one or more conductive fasteners configured to attach the chassis based antenna to the communication module, the one or more conductive fasteners being configured to electrically and mechanically couple the chassis based antenna and the communication module.

6. The communication device of claim 5, wherein the one or more conductive fasteners comprise:
    one or more nuts;
    one or more screws;
    one or more bolts; or
    one or more lags.

7. The communication device of claim 1, wherein the first electrical connection, the second electrical connection, the third electrical connection, and the fourth electrical connection are configured and arranged to allow the information to traverse between the first electrical connection and the third electrical connection and between the second electrical connection and the fourth electrical connection.

8. The communication device of claim 1, further comprising:
    a touch-screen display configured to provide an interface for the communication device, and
    wherein the mechanical chassis further contains the touch-screen display.

9. An electronic accessory, comprising: a communication module configured to communicate information; and a mechanical chassis having a wristband enclosure, the mechanical chassis containing the communication module, wherein the wristband enclosure includes a chassis based antenna, a first electrical connection, and a second electrical connection, the first electrical connection and the second electrical connection being configured to communicatively couple the chassis based antenna between a third electrical connection and a fourth electrical connection, respectively, of the communication module, and wherein the chassis based antenna includes: a conductive pathway, electrically and mechanically connecting the first electrical connection and the second electrical connection, configured to communicate the information with a communication device,
    wherein the conductive pathway is arranged to form a closed loop, the closed loop including the first electrical connection and the second electrical connection.

10. The electronic accessory of claim 9, wherein the communication module is configured to provide a current that propagates through the conductive pathway to generate a magnetic field to communicate the information with the communication device.

11. The electronic accessory of claim 9, wherein the communication module comprises:
a near field communication (NFC) communication module configured to provide a first current that propagates through the conductive pathway to generate a magnetic field to communicate the information with the communication device.

12. The electronic accessory of claim 11, wherein the chassis based antenna is configured to:
inductively receive a second current from a second magnetic field generated by the communication device, and
provide the second current to the NFC communication module over the conductive pathway to communicate the information with the communication device.

13. The electronic accessory of claim 9, wherein the conductive pathway comprises:
a conductive material configured to electrically connect the first electrical connection and the second electrical connection.

14. The electronic accessory of claim 9, wherein the first electrical connection and the second electrical connection comprise:
one or more conductive fasteners configured to attach the chassis based antenna to the communication module, the one or more conductive fasteners being configured to electrically and mechanically couple the chassis based antenna and the communication module.

15. The electronic accessory of claim 14, wherein the one or more conductive fasteners comprise:
one or more nuts;
one or more screws;
one or more bolts; or
one or more lags.

16. The electronic accessory of claim 9, wherein the first electrical connection, the second electrical connection, the third electrical connection, and the fourth electrical connection are configured and arranged to allow the information to traverse between the first electrical connection and third electrical connection and between the second electrical connection and the fourth electrical connection.

17. The electronic accessory of claim 9, further comprising:
a touch-screen display configured to provide an interface for the communication device, and
wherein the mechanical chassis further contains the touch-screen display.

18. A near field communication (NFC) communication device, comprising: a NFC communication module configured to operate on information in accordance with a NFC communication standard; and a mechanical chassis including a chassis based antenna, a first electrical connection, and a second electrical connection, the first electrical connection and the second electrical connection being configured to communicatively couple the chassis based antenna and third electrical connection and a fourth electrical connection, respectively, of the NFC communication module, and wherein the chassis based antenna includes: a conductive pathway, electrically and mechanically connecting the first electrical connection and the second electrical connection, configured to communicate the information with a second NFC communication device,
wherein the conductive pathway is arranged to form a closed loop, the closed loop including the first electrical connection and the second electrical connection.

19. The NFC communication device of claim 18, wherein the NFC communication module is configured to provide a current that propagates through the conductive pathway of the mechanical chassis to generate a magnetic field to communicate the information with the second NFC communication device.

20. The NFC communication device of claim 18, wherein the chassis based antenna is configured to:
inductively receive a second current from a second magnetic field generated by the second NFC communication device, and
provide the second current to the NFC communication module over the conductive pathway to communicate the information with the second NFC communication device.

21. The NFC communication device of claim 18, wherein the first electrical connection and the second electrical connection comprise:
one or more conductive fasteners configured to attach the chassis based antenna to the NFC communication module, the one or more conductive fasteners being configured to electrically and mechanically couple the chassis based antenna and the NFC communication module.

22. The NFC communication device of claim 21, wherein the one or more conductive fasteners comprise:
one or more nuts;
one or more screws;
one or more bolts; or
one or more lags.

23. The NFC communication device of claim 18, wherein the first electrical connection, the second electrical connection, the third electrical connection, and the fourth electrical connection are configured and arranged to allow the information to traverse between the first electrical connection and the third electrical connection and between the second electrical connection and the fourth electrical connection.

* * * * *